(12) United States Patent
Qin et al.

(10) Patent No.: US 12,482,468 B2
(45) Date of Patent: Nov. 25, 2025

(54) ELECTRONIC DEVICE, SPEECH RECOGNITION METHOD THEREFOR, AND MEDIUM

(71) Applicant: HUAWEI TECHNOLOGIES CO., LTD., Guangdong (CN)

(72) Inventors: Lei Qin, Shenzhen (CN); Lele Zhang, Shenzhen (CN); Hao Liu, Beijing (CN); Yuewan Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 18/020,851

(22) PCT Filed: Aug. 12, 2021

(86) PCT No.: PCT/CN2021/112307
§ 371 (c)(1),
(2) Date: Feb. 10, 2023

(87) PCT Pub. No.: WO2022/033556
PCT Pub. Date: Feb. 17, 2022

(65) Prior Publication Data
US 2024/0038238 A1  Feb. 1, 2024

(30) Foreign Application Priority Data

Aug. 14, 2020 (CN) .......................... 202010819053.1

(51) Int. Cl.
*G10L 15/25* (2013.01)
*G06T 7/50* (2017.01)
(Continued)

(52) U.S. Cl.
CPC ................ *G10L 15/25* (2013.01); *G06T 7/50* (2017.01); *G06V 10/26* (2022.01); *G06V 10/30* (2022.01);
(Continued)

(58) Field of Classification Search
CPC ......... G10L 15/02; G10L 15/16; G10L 15/25; G10L 25/24; G06T 7/50;
(Continued)

(56) References Cited

U.S. PATENT DOCUMENTS 5,027,404 A * 6/1991 Taguchi .................. G10L 19/07
704/E19.025
6,219,640 B1 * 4/2001 Basu ...................... G06V 40/16
704/231

(Continued)

FOREIGN PATENT DOCUMENTS

CN 102592607 A 7/2012
CN 102968993 A 3/2013
(Continued)

OTHER PUBLICATIONS

Georgios Galatas, Gerasimos Potamianos, Fillia Makedon, "Audio-visual speech recognition incorporating facial depth information captured by the Kinect", 2012, IEEE European Signal Processing Conference (EUSIPCO) (Year: 2012).*

(Continued)

*Primary Examiner* — Eric Yen
(74) *Attorney, Agent, or Firm* — WOMBLE BOND DICKINSON (US) LLP

(57) ABSTRACT

Embodiments of this application provide a speech recognition method. The speech recognition method includes: obtaining a facial depth image and a to-be-recognized voice of a user, where the facial depth image is an image collected by using a depth camera; recognizing a mouth shape feature from the facial depth image, and recognizing a voice feature from a to-be-recognized audio; and fusing the voice feature and the mouth shape feature into an audio-video feature, and recognizing, based on the audio-video feature, a voice uttered by the user.

18 Claims, 8 Drawing Sheets

(51) Int. Cl.
| | |
|---|---|
| *G06V 10/26* | (2022.01) |
| *G06V 10/30* | (2022.01) |
| *G06V 10/80* | (2022.01) |
| *G06V 10/82* | (2022.01) |
| *G06V 40/16* | (2022.01) |
| *G10L 15/02* | (2006.01) |
| *G10L 15/16* | (2006.01) |
| *G10L 25/24* | (2013.01) |

(52) U.S. Cl.
CPC ............ *G06V 10/806* (2022.01); *G06V 10/82* (2022.01); *G06V 40/171* (2022.01); *G10L 15/02* (2013.01); *G10L 15/16* (2013.01); *G10L 25/24* (2013.01); *G06T 2207/10028* (2013.01); *G06T 2207/20084* (2013.01); *G06T 2207/30201* (2013.01)

(58) Field of Classification Search
CPC . G06T 2207/10028; G06T 2207/20084; G06T 2207/30201; G06V 10/26; G06V 10/30; G06V 10/806; G06V 10/82; G06V 40/171
See application file for complete search history.

(56) References Cited

U.S. PATENT DOCUMENTS

| | | | | |
|---|---|---|---|---|
| 6,633,844 | B1* | 10/2003 | Verma | G10L 15/25 382/209 |
| 9,190,058 | B2 | 11/2015 | Klein | |
| 9,847,082 | B2 | 12/2017 | Mohideen et al. | |
| 10,828,130 | B2* | 11/2020 | Pokotilov | A61C 7/08 |
| 11,508,374 | B2* | 11/2022 | Abou Antoun | G10L 15/25 |
| 2002/0116197 | A1* | 8/2002 | Erten | G06F 18/254 704/E15.042 |
| 2003/0009325 | A1* | 1/2003 | Kirchherr | G10L 19/20 704/E19.041 |
| 2003/0018475 | A1* | 1/2003 | Basu | G06V 40/161 704/E11.003 |
| 2003/0212552 | A1* | 11/2003 | Liang | G10L 15/25 704/231 |
| 2004/0107098 | A1* | 6/2004 | Deligne | G10L 15/20 704/E15.041 |
| 2005/0063582 | A1* | 3/2005 | Park | G06T 17/10 382/181 |
| 2006/0106597 | A1* | 5/2006 | Stein | G10L 19/20 704/203 |
| 2008/0140393 | A1* | 6/2008 | Kim | G10L 19/0204 704/E19.014 |
| 2008/0159595 | A1* | 7/2008 | Park | G01B 11/25 382/106 |
| 2010/0088091 | A1* | 4/2010 | Lee | G10L 19/12 704/219 |
| 2011/0081082 | A1* | 4/2011 | Jiang | G10L 25/00 382/224 |
| 2011/0311144 | A1* | 12/2011 | Tardif | G10L 15/25 348/222.1 |
| 2012/0310637 | A1* | 12/2012 | Vitte | G10L 21/0208 704/226 |
| 2013/0085752 | A1* | 4/2013 | Kawashima | G10L 19/22 704/225 |
| 2014/0050392 | A1* | 2/2014 | Feng | G06V 40/171 382/218 |
| 2014/0122086 | A1* | 5/2014 | Kapur | A63F 13/213 704/E15.001 |
| 2014/0140620 | A1* | 5/2014 | Jiyun | G06T 5/70 382/173 |
| 2014/0288463 | A1* | 9/2014 | De Waele | A61B 5/4542 600/593 |
| 2015/0162010 | A1* | 6/2015 | Ishikawa | G10L 19/00 704/500 |
| 2015/0228278 | A1* | 8/2015 | Huang | G10L 15/25 382/118 |
| 2016/0292662 | A1* | 10/2016 | Kobayashi | G06V 10/143 |
| 2016/0314789 | A1* | 10/2016 | Marcheret | G10L 15/25 |
| 2018/0005054 | A1* | 1/2018 | Yu | G06N 3/08 |
| 2018/0253897 | A1* | 9/2018 | Satake | A63F 13/215 |
| 2018/0300865 | A1* | 10/2018 | Weiss | G05B 19/41875 |
| 2018/0315213 | A1* | 11/2018 | Surazhsky | G06F 18/214 |
| 2019/0304160 | A1* | 10/2019 | Izumi | G06T 15/04 |
| 2019/0341053 | A1* | 11/2019 | Zhang | H04L 12/1827 |
| 2019/0357997 | A1* | 11/2019 | Shi | G06V 20/64 |
| 2020/0083856 | A1* | 3/2020 | Tin Than | G10K 11/17821 |
| 2020/0398797 | A1* | 12/2020 | Herman | H04N 23/811 |
| 2021/0173916 | A1* | 6/2021 | Ortiz | G07G 1/009 |
| 2021/0248353 | A1* | 8/2021 | Yu | G06V 10/803 |
| 2022/0044022 | A1* | 2/2022 | Gan | G06V 20/46 |
| 2022/0075453 | A1* | 3/2022 | Huang | G06T 7/74 |
| 2023/0008363 | A1* | 1/2023 | Liu | G10L 17/10 |

FOREIGN PATENT DOCUMENTS

| | | |
|---|---|---|
| CN | 104620257 A | 5/2015 |
| CN | 104838335 A | 8/2015 |
| CN | 109637521 A | 4/2019 |
| CN | 110111783 A | 8/2019 |
| CN | 111241870 A | 6/2020 |
| CN | 111415388 A | 7/2020 |
| EP | 2912659 B1 | 12/2016 |
| JP | 6153728 B2 | 6/2017 |

OTHER PUBLICATIONS

M. Z. Ibrahim, D. J. Mulvaney, M. F. Abas, "Feature-fusion based audio-visual speech recognition using lip geometry features in noisy environment", 2015, ARPN Journal of Engineering and Applied Sciences (Year: 2015).*

Yuki Yasui, Nakamasa Inoue, Koji Iwano, Koichi Shinoda, "Multimodal speech recognition using mouth images from depth camera", 2017, Proceedings of APSIPA Annual Summit and Conference 2017, IEEE (Year: 2017).*

Jianrong Wang, Ju Zhang, Kiyoshi Honda, Jianguo Wei, Jianwu Dang, "Audio-visual speech recognition integrating 3D lip information obtained from the Kinect", 2016, Multimedia Systems (Year: 2016).*

M. Z. Ibrahim and D. J. Mulvaney, "A lip geometry approach for feature-fusion based audio-visual speech recognition," 2014, 2014 6th International Symposium on Communications, Control and Signal Processing (ISCCSP), Athens, Greece, pp. 644-647 (Year: 2014).*

T. Hoang Ngan Le, Marios Savvides, "A novel Shape Constrained Feature-based Active Contour model for lips/mouth segmentation in the wild", 2016, Pattern Recognition, vol. 54, pp. 23-33, (Year: 2016).*

A. L. Jutinico and F. Prieto, "Visual Lip Segmentation in Patients with Cleft Lip and/or Cleft Palate," 2011, 2011 IEEE Electronics, Robotics and Automotive Mechanics Conference, Cuernavaca, Mexico, pp. 114-119, (Year: 2011).*

Wu Wenchao, Wang Shilin, Kuruoglu Ercan Engin, Ma Xiaoli, Li Shenghong, Li Jianhua, Lionel M. Ni., "Optimization of Lip Contour Estimation," Apr. 2014, in Chinese Journal of Electronics, vol. 23, No. 2, pp. 341-347, (Year: 2014).*

S. Jain, P. C. Pandey and R. Velmurugan, "Lip contour detection for estimation of mouth opening area," 2015, 2015 Fifth National Conference on Computer Vision, Pattern Recognition, Image Processing and Graphics (NCVPRIPG), Patna, India, pp. 1-4 (Year: 2015).*

Pingchuan Ma et al:"Investigating the Lombard Effect Influence on End-to-End Audio-Visual Speech Recognition." arXiv:1906.02112v4, Jul. 9, 2019. total 5 pages.

Georgios Galatas et al:"Audio-Visual Speech Recognition Incorporating Facial Depth Information Captured by the Kinect." 20th European Signal Processing Conference (EUSIPCO 2012), Bucharest, Romania, Aug. 27-31, 2012. total 4 pages.

Usha Sharma et al:"Study of Robust Feature Extraction Techniques for Speech Recognition System." 2015 1st International conference

(56) References Cited

OTHER PUBLICATIONS on futuristic trend in computational analysis and knowledge management (Ablaze ). Feb. 25, 2015, total 5 pages.
Voicebot:"In-Car Voice Assistant Consumer Adoption Report." Jan. 2019, total 35 pages.

\* cited by examiner

ELECTRONIC DEVICE, SPEECH RECOGNITION METHOD THEREFOR, AND MEDIUM

CROSS-REFERENCE TO RELATED APPLICATIONS

This application is a National Stage of International Patent Application No. PCT/CN2021/112307, filed on Aug. 12, 2021, which claims priority to Chinese Patent Application No. 202010819053.1, filed on Aug. 14, 2020, both of which are hereby incorporated by reference in their entireties.

TECHNICAL FIELD

This application relates to the field of intelligent devices, and in particular, to an electronic device, a speech recognition method therefor, and a medium.

BACKGROUND

In an in-vehicle environment, voice interaction gradually replaces physical buttons and multi-touch to become a mainstream human-computer interaction manner in a vehicle due to great advantages in convenience and safety. The voice interaction in the vehicle brings good user experience, for example, safety (freeing hands and avoiding distractions), convenience (improving efficiency, reducing learning, and providing a timely feedback), and fun (emotional interaction and spiritual enjoyment).

Although the voice interaction brings plenty of convenience, there are also some problems. As the in-vehicle environment changes, a voice interaction effect becomes poor. For example, noise of an environment in which a vehicle is located changes continuously with various factors such as a vehicle speed, a road section, a road condition, an air conditioner, a vehicle window, a passenger, and a speaker. The environmental noise affects voice interaction accuracy. If an in-vehicle infotainment system incorrectly recognizes, during driving, a voice uttered by a user, a navigation error may be caused, thereby affecting a driving mood of the user, and increasing a driving risk. Therefore, there is a need for a method that can be used to overcome an environmental factor and improve speech recognition accuracy during driving.

SUMMARY

Embodiments of this application provide an electronic device, a speech recognition method therefor, and a medium, to improve speech recognition accuracy.

A first aspect of this application provides a speech recognition method for an electronic device, including: obtaining a facial depth image and a to-be-recognized voice of a user, where the facial depth image is an image collected by using a depth camera; recognizing a mouth shape feature from the facial depth image, and recognizing a voice feature from a to-be-recognized audio; and fusing the voice feature and the mouth shape feature into an audio-video feature, and recognizing, based on the audio-video feature, a voice uttered by the user.

In some embodiments, because the mouth shape feature extracted from the facial depth image is not affected by light of an environment, the mouth shape feature can more accurately reflect a mouth shape change obtained when the user utters the voice. The mouth shape feature extracted from the facial depth image and the voice feature are fused, so that speech recognition accuracy can be improved.

The face of the user emits an infrared light pulse and obtains an infrared light pulse reflected by the face of the user. A time difference is calculated based on a change between phases of the emitted and reflected infrared light pulses. Depth information of the face of the user is calculated with reference to a propagation speed of the infrared light pulse and the time difference. The depth information is saved as the facial depth image of the user.

In an embodiment, the depth information is a value formed by performing uniform quantizing on a maximum depth distance and a minimum depth distance between the face of the user and the electronic device.

In an embodiment, the recognizing a mouth shape feature from the facial depth image includes: performing noise reduction on the facial depth image, and binarizing the facial depth image based on depth information of each pixel in a facial depth image obtained after noise reduction is performed, to obtain a binarized image; and determining contours of lips in the binarized image, and segmenting the lips based on the contours of the lips.

In some embodiments, the depth information of each pixel in the facial depth image is converted into a single-channel greyscale image, and is normalized, and finally, the obtained greyscale image is binarized to obtain a binarized image. The lips of the user may be obtained more accurately in the binarized image.

In an embodiment, a mouth shape feature corresponding to the lips is obtained by using a convolutional neural network.

In an embodiment, the recognizing a mouth shape feature from the facial depth image includes:
  separating a lip region sub-image from the facial depth image; and
  inputting the lip region sub-image into the convolutional neural network to obtain a mouth shape feature corresponding to the lip region sub-image.

In some embodiments, after the lip region sub-image of the user is extracted from the facial depth image, instead of being binarized, the lip region sub-image may directly be input into a video neural network model to calculate the mouth shape feature.

In an embodiment, the performing speech recognition on the to-be-recognized voice to obtain a voice feature in the to-be-recognized voice includes: separating a first frequency band range part and a second frequency band range part from the to-be-recognized voice by using a linear predictor, where a frequency of a frequency band included in the first frequency band range part is lower than a frequency of a frequency band included in the second frequency band range part; and using at least one of a first voice feature extracted from the first frequency band range part and a second voice feature extracted from the second frequency band range part as the voice feature of the to-be-recognized voice.

In some embodiments, a low-frequency part or a sound channel signal (the first frequency band range part) that indicates a sound channel feature in the to-be-recognized voice is separated from a high-frequency harmonic part or a sound source signal (the second frequency band range part) that indicates a sound source feature, so that the voice features are separately extracted.

In an embodiment, the first voice feature and the second voice feature are fused to obtain the voice feature. The first voice feature is extracted from the first frequency band range part by using a voice feature extraction algorithm used for simulating a perception capability of a cochlea of a human ear. The voice feature extraction algorithm used for simulating a perception capability of a cochlea of a human ear is a mel-frequency cepstral coefficient MFCC extraction method, and the first voice feature is a mel-frequency cepstral coefficient MFCC.

In some embodiments, separating the to-be-recognized voice into the first frequency band range part and the second frequency band range part can avoid interference of the high-frequency harmonic part to the mel-frequency cepstral coefficient (MFCC) feature extraction algorithm used for simulating a perception capability of a cochlea of a human ear, to improve audio recognition accuracy.

In an embodiment, the second voice feature is extracted from the second frequency band range part through wavelet transform, where the second voice feature is a time-frequency feature obtained through wavelet transform.

A time-frequency feature parameter of the sound source signal separated from the to-be-recognized voice by using the linear predictor is extracted through wavelet transform, so that the sound source feature of the user who utters the to-be-recognized voice can be effectively represented.

In an embodiment, the first frequency band range part represents a feature of a sound channel of a sound-uttering object that utters audio, and the second frequency band range part represents a feature of a sound source of the sound-uttering object.

In an embodiment, the separating a first frequency band range part and a second frequency band range part from the audio by using a linear predictor includes: separating the first frequency band range part from the audio by using the linear predictor, and using, as the second frequency band range part, a remaining part of the audio obtained after the first frequency band range part is separated.

In an embodiment, the fusing the voice feature and the mouth shape feature into an audio-video feature includes:
obtaining a voice feature matrix and a mouth shape feature matrix corresponding to the voice feature and the mouth shape feature, where a dimension of the voice feature matrix is the same as a dimension of the mouth shape feature matrix; and calculating the audio-video feature corresponding to the voice feature matrix and the mouth shape feature matrix through concatenation.

In an embodiment, weighting calculation is performed on a value of the voice feature matrix and a value of the mouth shape feature matrix to obtain the audio-video feature.

In some embodiments, speech recognition is performed through fusion by using both the voice feature and the mouth shape feature. For example, the voice feature and the mouth shape feature may be linearly fused, and combined into the audio-video feature through concatenation. Alternatively, the voice feature and the mouth shape feature may be normalized and then linearly fused, or the voice feature and the mouth shape feature may be weighted and then linearly fused, to form the audio-video feature.

In an embodiment, the recognizing the voice of the user based on the audio-video feature includes: obtaining, through a convolutional neural network, a voice feature value corresponding to the audio-video feature, where the voice feature value is used to represent a probability of information indicated by the voice; and recognizing, based on the probability of the information, the voice uttered by the user.

In some embodiments, the feature value corresponding to the audio-video feature is calculated through the convolutional neural network, and determining is performed based on the calculated feature value and the probability of the information indicated by the voice; and the voice uttered by the user is recognized based on a difference between the feature value and the probability.

In an embodiment, deduplication calculation is performed on the voice feature value by using a time series classification algorithm, to remove repeated information included in the voice feature value.

A second aspect of this application provides an electronic device, including:
a depth camera, where the depth camera is configured to obtain a facial depth image of a user;
an audio collection device, where the audio collection device is configured to obtain a to-be-recognized voice of the user; and
a processor and a memory, where the processor is coupled to the memory, program instructions are stored in the memory, and when the program instructions stored in the memory are executed by the processor, the electronic device is enabled to control the depth camera and the audio collection device to perform the speech recognition method provided in the first aspect.

A third aspect of this application provides a computer-readable medium, where instructions are stored in the computer-readable medium, and when the instructions are executed on a computer, the computer is enabled to perform the speech recognition method provided in the first aspect.

DESCRIPTION OF EMBODIMENTS

Figure 1:
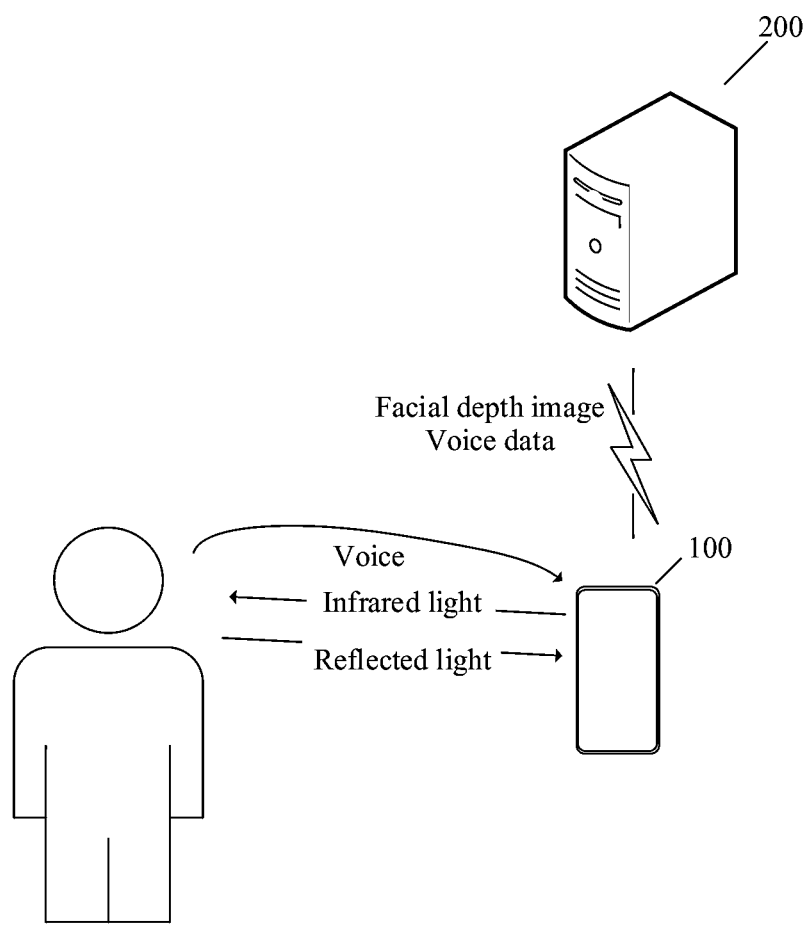
FIG. 1 shows a scenario of performing speech recognition by using a method provided in this application according to some embodiments of this application.

This application is further described below with reference to specific embodiments and accompanying drawings. It can be understood that the specific embodiments described herein are only for explaining this application, rather than limiting this application. In addition, for ease of description, only some, rather than all, of structures or processes related to this application are shown in the accompanying drawings. It should be noted that in this specification, similar reference numerals and letters indicate similar items in the following accompanying drawings.

Embodiments of this application include but are not limited to a speech recognition method for fusing an audio and a video, an apparatus, and a medium. To make the objectives, technical solutions, and advantages of this application clearer, the following further describes the implementations of this application in detail with reference to the accompanying drawings.

FIG. 1 is a diagram of a speech recognition scenario of an electronic device according to some embodiments of this application. As shown in FIG. 1, the speech recognition scenario includes: The electronic device 100 collects a voice uttered by a user, and the electronic device 100 shoots, by using a depth camera, a facial depth image used when the user utters the voice. Next, the electronic device 100 sends the voice and the facial depth image to a server 200. The server 200 respectively extracts a voice feature and a mouth shape feature of the user from the voice and the facial depth image, then fuses the voice feature and the mouth shape feature of the user into an audio-video feature, and recognizes, based on the audio-video feature, information indicated by the voice uttered the user. Because the mouth shape feature extracted from the facial depth image is not affected by light of an environment, the mouth shape feature can more accurately reflect a mouth shape change obtained when the user utters the voice. The mouth shape feature extracted from the facial depth image and the voice feature are fused, so that speech recognition accuracy can be improved.

It can be understood that in this embodiment of this application, cameras used by the electronic device 100 to shoot the facial depth image of the user may be various depth cameras, such as a depth camera based on structured light, a depth camera based on a time of flight (TOF) ranging method, and a binocular depth camera with an infrared strobe light. For example, in the scenario shown in FIG. 1, the facial depth image is formed by receiving infrared light that is reflected by a face and that is emitted to the face of the user by using the depth camera, and is not affected by light of an environment in which the user is located.

It can be understood that the electronic device 100 may be a laptop computer, a desktop computer, a tablet computer, a mobile phone, a server, a wearable device, a head-mounted display, a mobile email device, a portable game console, a portable music player, a reader device, an in-vehicle infotainment system, or another electronic device capable of accessing a network. In some implementations, this embodiment of this application may also be applied to a wearable device worn by a user, for example, a smartwatch, a band, jewelry (for example, a device made into a decorative item such as an earring or a bracelet), or glasses, or a part of a watch, a band, jewelry, or glasses. For ease of description, the in-vehicle infotainment system 100 is used as an example below for description.

The server 200 may be a hardware server, or may be implanted in a virtualized environment. For example, according to some embodiments of this application, the server 200 may be a virtual machine executed on a hardware server including one or more other virtual machines. According to some embodiments of this application, the server 200 may interact with the electronic device 100 through a network, for example, sending data to and/or receiving data from the electronic device 100.

Figure 2:
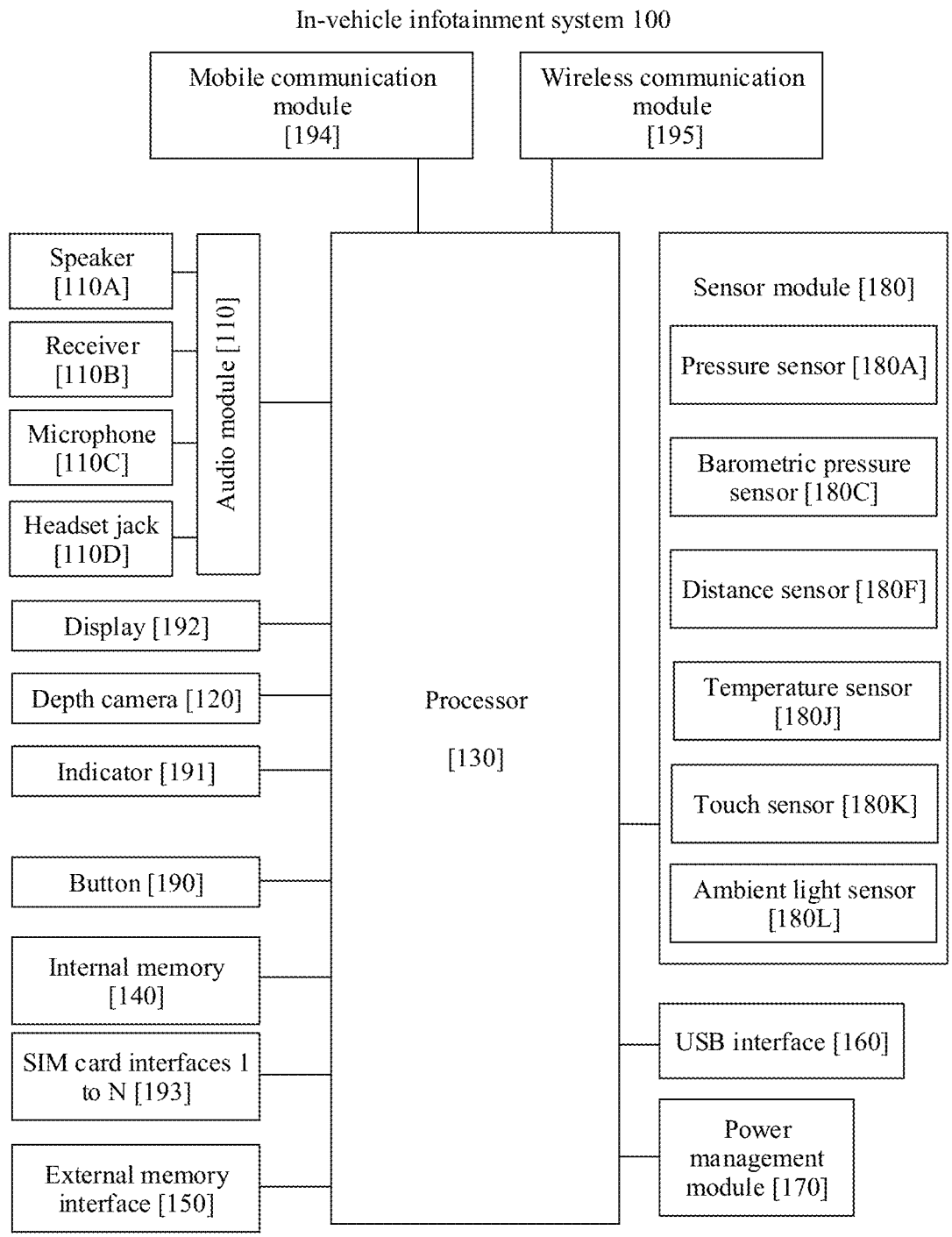
FIG. 2 is a diagram of a hardware structure of an in-vehicle infotainment system used in this application according to some embodiments of this application.

FIG. 2 is a schematic diagram of a structure of an in-vehicle infotainment system 100 applicable to this application.

As shown in FIG. 2, the in-vehicle infotainment system 100 may include: an audio module 110, a speaker 110A, a receiver 110B, a microphone 110C, a headset jack 110D, a depth camera 120, a processor 130, an internal memory 140, an external memory interface 150, a universal serial bus (USB) interface 160, a charging management module 170, a sensor module 180, a button 190, an indicator 191, a display 192, and a subscriber identity module (SIM) card interface 193, an antenna 1, an antenna 2, a mobile communication module 194, a wireless communication module 195, and the like.

The in-vehicle infotainment system 100 may implement an audio function, for example, music playing and recording, through the audio module 110, the speaker 110A, the receiver 110B, the microphone 110C, the headset jack 110D, an application processor, and the like.

The audio module 110 is configured to convert digital audio information into an analog audio signal output, and is also configured to convert an analog audio input into a digital audio signal. The audio module 110 may be further configured to: encode and decode an audio signal. In some embodiments, the audio module 110 may be disposed in the processor 130, or some functional modules of the audio module 110 are disposed in the processor 130.

The speaker 110A, also referred to as a "loudspeaker", is configured to convert an audio electrical signal into a sound signal.

The receiver 110B, also referred to as an "earpiece", is configured to convert an audio electrical signal into a sound signal.

The microphone 110C, also referred to as a "mike" or a "mic", is configured to convert a sound signal into an electrical signal. At least one microphone 110C may be disposed on the in-vehicle infotainment system 100. In this embodiment of the present invention, the microphone 110C is configured to collect a voice uttered by a user.

The headset jack 110D is configured to connect to a wired headset. The headset jack 110D may be the USB interface 160, or may be a 3.5 mm open mobile terminal platform (OMTP) standard interface or a cellular telecommunications industry association of the USA (CTIA) standard interface.

The in-vehicle infotainment system 100 may shoot and collect, by using an ISP, the depth camera 120, a video codec, a GPU, the display 192, and an application processor, a facial depth image obtained when the user utters the voice.

The processor 130 may include one or more processing units. For example, the processor 130 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The internal memory 140 may be configured to store computer-executable program code. The executable program code includes instructions. The internal memory 140 may include a program storage area and a data storage area. The processor 130 runs instructions stored in the internal memory 140 and/or instructions stored in the memory disposed in the processor, to perform various function applications and data processing of the in-vehicle infotainment system 100. In this embodiment of the present invention, the internal memory 140 may be configured to store neural network models in embodiments of this application.

The external memory interface 150 may be used to connect to an external storage card, for example, a micro SD card, to extend a storage capability of the in-vehicle infotainment system 100. The external storage card communicates with the processor 130 through the external memory interface 150, to implement a data storage function. For example, files such as music and a video are stored in the external storage card.

The power management module 170 is configured to perform power input to the in-vehicle infotainment system from a power supply device of a vehicle.

A wireless communication function of the in-vehicle infotainment system 100 may be implemented by using the antenna 1, the antenna 2, the mobile communication module 194, the wireless communication module 195, the modem processor, a baseband processor, and the like. The antenna 1 and the antenna 2 are configured to transmit and receive electromagnetic wave signals.

The mobile communication module 194 may provide wireless communication solutions that include 2G, 3G, 4G, 5G, or the like and that are applied to the in-vehicle infotainment system 100.

The wireless communication module 195 may provide a wireless communication solution that is applied to the in-vehicle infotainment system 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 195 receives an electromagnetic wave through the antenna 2, performs frequency modulation and filtering processing on an electromagnetic wave signal, and sends a processed signal to the processor 130.

The button 190 includes a power button, a volume button, and the like. The button 190 may be a mechanical button or a touch button. The in-vehicle infotainment system 100 may receive a button input, and generate a button signal input related to user settings and function control of the in-vehicle infotainment system 100.

The indicator 191 may be an indicator light, and may be configured to indicate a charging status and a power change, or may be configured to indicate a message, a missed call, a notification, and the like.

The SIM card interface 195 is configured to connect to a SIM card. A SIM card may be inserted into or pulled out from the SIM card interface 195, to implement contact with or separation from the in-vehicle infotainment system 100. The in-vehicle infotainment system 100 interacts with a network by using the SIM card, to implement functions such as calling and data communication. In some embodiments, the in-vehicle infotainment system 100 uses an eSIM, that is, an embedded SIM card. The eSIM card may be embedded into the in-vehicle infotainment system 100 and cannot be separated from the in-vehicle infotainment system 100.

Figure 3:
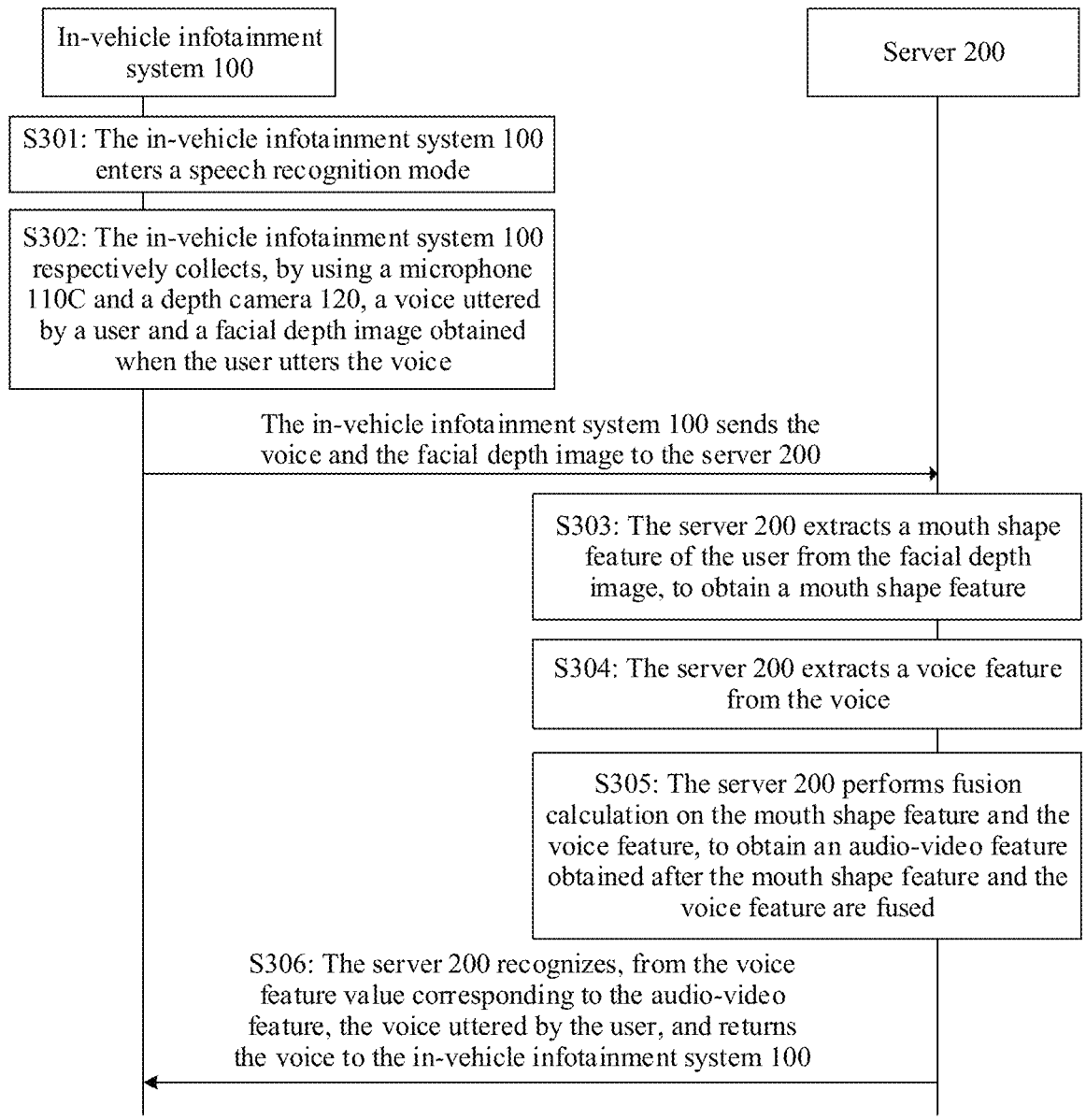
FIG. 3 is a flowchart of implementing speech recognition by an in-vehicle infotainment system and a server according to some embodiments of this application.

The speech recognition method based on fusion of an audio and a video is described below in detail with reference to FIG. 3.

When a user is driving a vehicle, the user utters a voice instruction to the in-vehicle infotainment system 100. For example, the user utters a voice of "enable navigation", and the in-vehicle infotainment system 100 collects the voice of the user and a facial depth image by using the microphone 110C and the depth camera 120, and sends the voice and the facial depth image to the server 200. After the server 200 recognizes, from the voice and the facial depth image, that the voice instruction uttered by the user is "enable navigation", the in-vehicle infotainment system 100 starts an installed navigation APP. Specifically, the foregoing speech recognition method includes:

Operation S301: The in-vehicle infotainment system 100 enters a speech recognition mode.

The user may send a speech recognition trigger instruction to the in-vehicle infotainment system 100 by using a button that is disposed in the vehicle and that has a speech recognition trigger function, so that the in-vehicle infotainment system 100 enters the speech recognition mode. The button may be a hard button disposed on a steering wheel of the vehicle, or the button 190 on the in-vehicle infotainment system 100.

In another embodiment of this application, the user may also interact with the in-vehicle infotainment system 100, to enable the in-vehicle infotainment system 100 to enter the speech recognition mode. For example, the user utters "enable the speech recognition function" to the in-vehicle infotainment system 100, or the button having the speech recognition trigger function is disposed on a human-computer interaction interface of the display 192 of the in-vehicle infotainment system 100, and the user touches the button through tapping, sliding, or the like to trigger the speech recognition function, so that the in-vehicle infotainment system 100 enters the speech recognition mode.

Operation S302: The in-vehicle infotainment system 100 respectively collects, by using the microphone 110C and the depth camera 120, the voice uttered by the user and the facial depth image obtained when the user utters the voice.

In the speech recognition mode, the in-vehicle infotainment system 100 listens to the voice that is uttered by the user to the in-vehicle infotainment system 100. For example, the user utters the voice of "enable navigation" to the in-vehicle infotainment system 100, the in-vehicle infotainment system 100 may collect and save, by using the microphone 110C, the voice uttered by the user, the in-vehicle infotainment system 100 collects, by using the depth camera 120, the facial depth image obtained when the user utters the voice, and the in-vehicle infotainment system 100 saves the collected facial depth image. The facial depth image herein is a facial depth image obtained when the in-vehicle infotainment system 100 collects, by using the depth camera 120 with a depth perception technology, the voice uttered by the user. In addition, in some embodiments, the in-vehicle infotainment system 100 may further encode and save the voice and the facial depth image together as one file.

It can be understood that in another embodiment, the in-vehicle infotainment system 100 may further collect, by using one audio collection apparatus including a microphone, the voice uttered by the user, and the audio collection apparatus may be a part of the in-vehicle infotainment system 100, or may be an independent apparatus. When the audio collection apparatus is an apparatus externally independent of the in-vehicle infotainment system 100, the audio collection apparatus may send a collected audio signal to the in-vehicle infotainment system 100 through a communication connection to the in-vehicle infotainment system 100. For example, the audio collection apparatus may be an audio monitoring unit or a recording microphone.

In addition, it can be understood that in another embodiment, the in-vehicle infotainment system 100 may further collect, by using a video collection apparatus including a depth camera, the facial depth image obtained when the user utters the voice, and the video collection apparatus may be a part of the in-vehicle infotainment system 100, or may be an independent apparatus. When the video collection apparatus is an apparatus externally independent of the in-vehicle infotainment system 10, the video collection apparatus may send the collected facial depth image to the in-vehicle infotainment system 100 through a communication connection to the in-vehicle infotainment system 100. For example, the video collection apparatus may be an external depth camera.

Next, operations S303 and S304 are performed.

Operation S303: The in-vehicle infotainment system 100 sends the voice and the facial depth image to the server 200, and the server 200 extracts a mouth shape feature of the user from the facial depth image, to obtain the mouth shape feature.

For example, in some embodiments, the server 200 first extracts lip region sub-images from the facial depth image, arranges the lip region sub-images in chronological order, inputs the lip region sub-images into a video feature neural network, and outputs the mouth shape feature through the neural network. The mouth shape feature herein may be an N-dimensional array. A detailed extraction process is described below.

Operation S304: The server 200 extracts a voice feature from the corresponding voice.

For example, in some embodiments, the server 200 may convert the voice into audio data in an array form, perform short-time Fourier transform, to obtain a short-time Fourier transform (STFT) coefficient corresponding to the audio data, input the audio data into the voice feature neural network in chronological order, and output the voice feature through the neural network. The voice feature herein may also be an N-dimensional array. A detailed extraction process is described below.

Then, operation S305 is performed: The server 200 performs fusion calculation on the mouth shape feature and the voice feature, to obtain an audio-video feature obtained after the mouth shape feature and the voice feature are fused.

For example, in some embodiments, the mouth shape feature and the voice feature may be calculated by using a fusion algorithm of concatenation or weighting, to obtain the audio-video feature. Based on the foregoing fusion algorithm, the audio-video feature is obtained by fusing the mouth shape feature and the voice feature of the user that are extracted in a same time period, and then the server 200 may recognize the voice of the user based on the audio-video feature. A detailed fusion process and recognition process are described below.

Figure 4A:
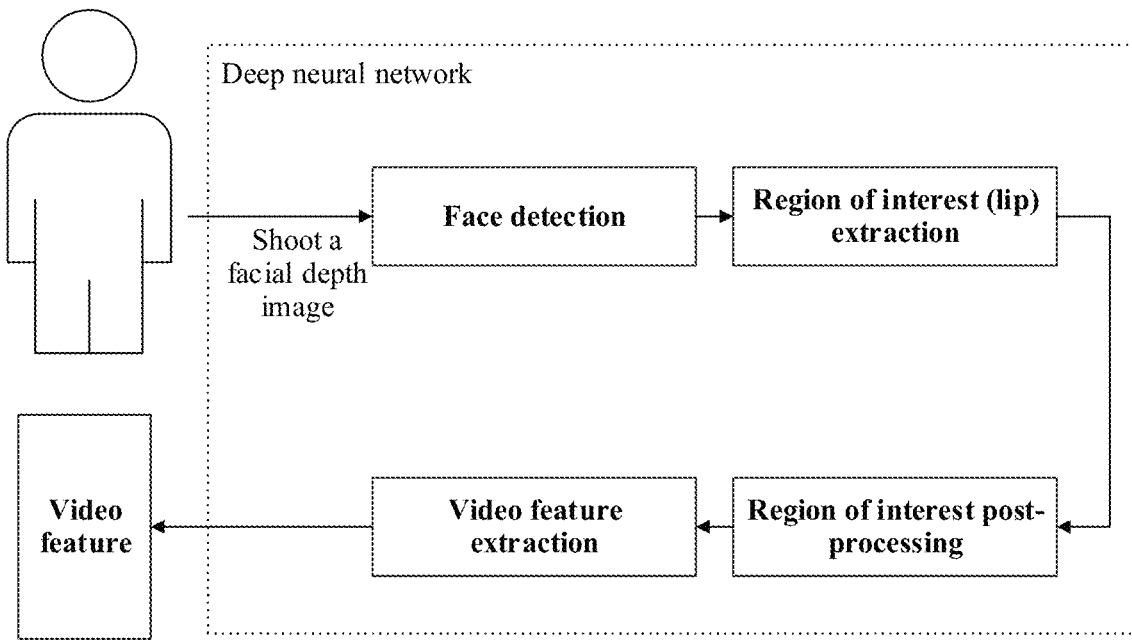
FIG. 4a shows a process of extracting a mouth shape feature of a facial depth image by a server according to some embodiments of this application.
Figure 4B:
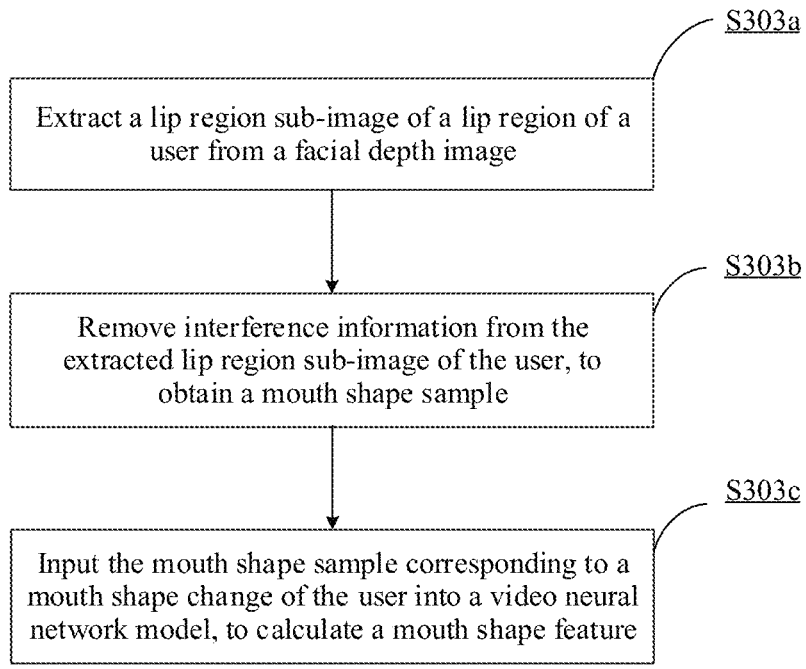
FIG. 4b shows a process of extracting the mouth shape feature of the facial depth image by the server described in FIG. 4a according to some embodiments of this application.

For the foregoing operation 303, in some embodiments, FIG. 4*a* shows a process of a manner of extracting a mouth shape feature of a user from a facial depth image by a server 200, to obtain a feature corresponding to a mouth shape. As shown in FIG. 4*b*, specific operations of the process include:

Operation S303*a*: Extract a lip region sub-image of a lip region of the user from the facial depth image.

Figure 5A:
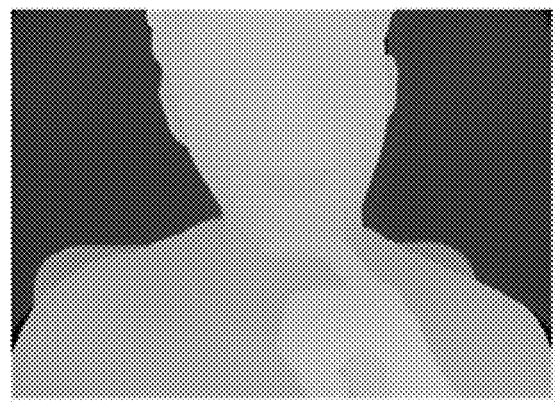
FIG. 5a shows a depth image indicated by using depth information collected by using a depth camera according to some embodiments of this application.
Figure 5B:
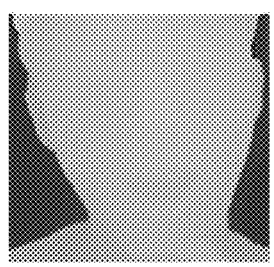
FIG. 5b shows a human face region obtained from FIG. 5a through human face detection according to some embodiments of this application.

In this embodiment of this application, the in-vehicle infotainment system 100 may collect the facial depth image of the user based on collection duration described in operation S302. The collection duration is duration from a time at which the user starts to utter the voice to the in-vehicle infotainment system 100 to a time at which the voice ends. For example, if the depth camera of the in-vehicle infotainment system 100 collects a video with a frame rate of 24 frames per second and duration of 3 seconds, the video includes 72 facial depth images. In the facial depth image, the face of the user is indicated by using depth information collected by the depth camera 120. As shown in FIG. 5*a* and FIG. 5*b*, the depth information is a value within a range from 0 to 255 that is formed by performing uniform quantizing on a maximum depth distance and a minimum depth distance between the face of the user and the depth camera 120, so that the foregoing facial depth image can be obtained. A lighter color indicates a shorter distance to the camera, and a darker color indicates a longer distance to the camera. It can be seen from FIG. 5*b* that when the user utters a voice, depth information of the lip region of the user is different from depth information of a region around the lips.

Figure 5C:
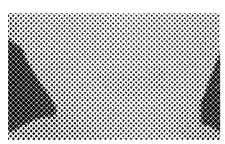
FIG. 5c shows a lip region captured from the human face region in FIG. 5b according to some embodiments of this application.

In this embodiment of this application, the server 200 may first perform preliminary region of interest (ROI) locating on the lips in the facial depth image, to obtain the lip region. For example, as shown in FIG. 5*c*, the region of interest may be defined as one-third of a height and half of an intermediate width of a detected face rectangular frame.

Operation S303*b*: Remove interference information from the extracted lip region sub-image of the user, to obtain a mouth shape sample. Specifically, the process includes the following operations.

(A) The server 200 performs noise reduction, smoothing, and histogram equalization on the lip region sub-image.

The server 200 may process the lip region sub-image through one or more of noise reduction, smoothing, and histogram equalization, to help extract information about a subsequent face. Performing noise reduction on the lip region sub-image is used as an example below for description. Noise reduction is a process of reducing noise in the lip region sub-image. The server 200 may perform noise reduction on the lip region sub-image by using a Gaussian filtering technology. Gaussian filtering is to weight the lip region sub-image. Each pixel in the lip region sub-image is scanned, and a value of the pixel is replaced with weighted average depth information of other pixels in an adjacent region of the pixel, to implement noise reduction on the lip region sub-image.

In addition, it can be understood that although noise reduction is performed on the image by using the Gaussian filtering technology as an example in the foregoing embodiment, in some embodiments, noise reduction may also be performed on the lip region sub-image by using a noise reduction method, for example, median filtering or mean filtering.

In some other embodiments of the present invention, the server 200 may further perform smoothing and histogram equalization on the lip region sub-image. Smoothing and histogram equalization are also intended to remove noise in the lip region sub-image, the server 200 may smooth the lip region sub-image through low-pass filtering, and low-pass filtering may filter out high-frequency interference noise in the lip region sub-image. However, histogram equalization may make depth information of the lip region sub-image evenly distributed, so that contrast of the lip region sub-image can be enhanced.

Figure 5D:
FIG. 5d shows a mouth shape region obtained from the lip region in FIG. 5c through binarization according to some embodiments of this application.

(B) Convert depth information of each pixel in the lip region sub-image into a single-channel greyscale image, and perform normalization. As shown in FIG. 5d, the obtained greyscale image is then binarized, to obtain a binarized image. A binarization threshold used for binarization may be set depending on an actual situation. When binarization is performed, if the depth information of the pixel is greater than the binarization threshold, the depth information of the pixel is set to 255 (or another maximum grayscale value), and in this case, a corresponding color is white; otherwise, if the depth information of the pixel is less than the binarization threshold, the depth information of the pixel is set to 0, and in this case, a corresponding color is black. Different binarized mouth shape samples may be obtained based on different thresholds. When binary values are 0 and 255, the mouth shape sample may be indicated by using a numerical sequence of 0 and 255. For example, for the word "enable" in the voice of "enable navigation" uttered by the user, a numerical sequence corresponding to the word may be (0, 255, . . . , 255).

(C) Arrange the mouth shape samples in chronological order, to obtain a set of mouth shape samples indicating a mouth shape change of the user in the foregoing collection duration. For example, a set of mouth shape samples corresponding to the voice of "enable navigation" uttered by the user may be a 4-dimensional numerical sequence including words in the "enable navigation", and the 4-dimensional numerical sequence may be [(0, 255, . . . , 255), (0, 0, . . . , 255), (0, 255, . . . , 0), (255, 0, . . . , 255)].

Operation S303c: Input the mouth shape samples corresponding to the mouth shape change of the user into a video neural network model, to calculate the mouth shape feature.

The video neural network model herein may be a convolutional neural network. An input value of the model may be a mouth shape sample obtained from the image. The mouth shape feature corresponding to the mouth shape sample that is input is calculated. An output layer of the model may include N convolution kernels, and the mouth shape feature that is output from the model may be indicated by using an N-dimensional array. N herein is configurable. For example, for a mouth shape sample of a word "enable", a mouth shape feature that is output by the model may be $T_V(V_1, \ldots, V_N)$. V herein is a floating point number.

It can be understood that in some embodiments, the video neural network model is obtained through training, and a training process includes: The server 200 may arrange the mouth shape samples of the mouth shape change of the user corresponding to the voice uttered by the user in chronological order, input the mouth shape samples into the video neural network model, and train the video neural network model. For example, the server 200 inputs, into the video neural network model, the mouth shape samples of the mouth shape change of the user corresponding to the voice of "enable navigation" that is uttered by the user and that is collected by the in-vehicle infotainment system 100, and compares a model output (that is, a training result obtained by training the model by using the mouth shape samples of the mouth shape change of the user corresponding to the voice of "enable navigation") with the mouth shape feature representing the voice of "enable navigation", to obtain an error (that is, a difference between the model output and the mouth shape feature), and updates a weight of the video neural network model based on the error. It is considered that model training is completed until the final model output represents the mouth shape feature of the voice of "enable navigation". It can be understood that training may be further performed by inputting mouth shape samples of a mouth shape change of the user corresponding to another voice. In this way, during training in a scenario with a large quantity of samples, a weight is continuously adjusted, and when an error that is output reaches a quite small value (for example, a predetermined error threshold is met), it is considered that the neural network model converges, and the video neural network model is obtained through training.

It can be understood that conversion of the lip region sub-image into the binarized image through binarization in operation S303b is merely an embodiment. In another embodiment of this application, after the lip region sub-image of the user is extracted from the facial depth image, as shown in FIG. 5c, instead of being binarized, the lip region sub-image may directly be input into the video neural network model to calculate the mouth shape feature.

Figure 6A:
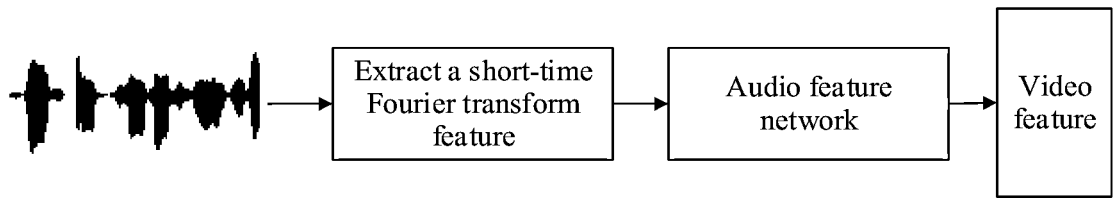
FIG. 6a shows a process of extracting a voice feature of a voice by a server according to some embodiments of this application.
Figure 6B:
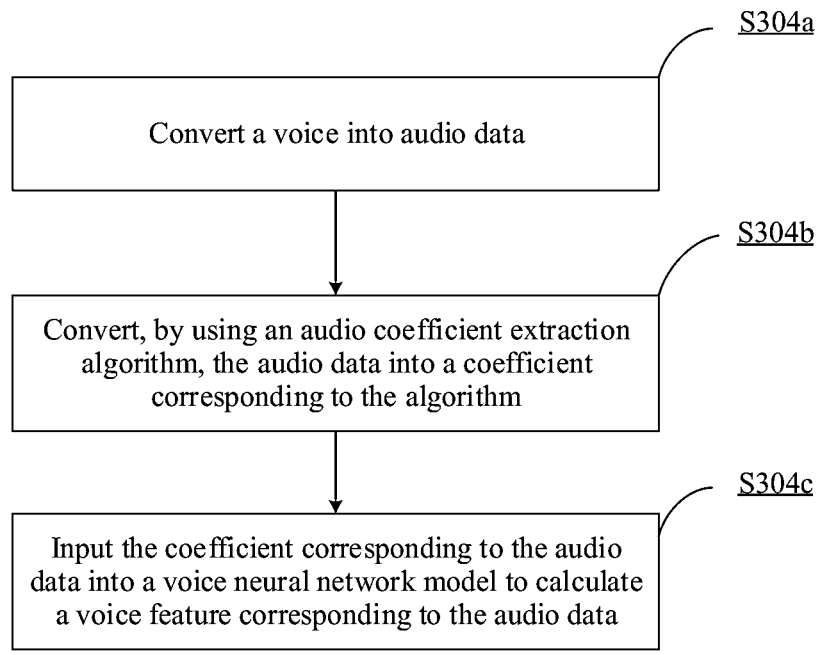
FIG. 6b is a flowchart of extracting the voice feature of the voice by the server described in FIG. 6a according to some embodiments of this application.

For the foregoing operation 304, in some embodiments, FIG. 6a shows a process of extracting a voice feature of a voice by a server 200, to obtain the voice feature corresponding to the voice. As shown in FIG. 6b, specific operations of the process include:

Operation S304a: Convert the voice into audio data.

The server 200 may collect the voice based on the collection duration described in operation S302. The collection duration for collecting the voice is the same as collection duration for collecting a video by the in-vehicle infotainment system 100 in operation S303. The server 200 converts the collected voice into the audio data. The audio data herein is read from the voice, a format of the audio data is a one-dimensional array, and a length is determined based on the collection duration and a sampling rate. For example, when the sampling rate is 8 kHz, it indicates that the in-vehicle infotainment system 100 samples 8000 data values within one second. If collection duration of the voice of "enable navigation" uttered by the user is two seconds, the audio data includes 16000 data values. The data value herein may indicate an amplitude of audio.

Next, the collected audio data is divided into frames. The server 200 may divide the audio data with duration of two seconds into frames based on the frame rate of the facial depth image data collected in operation S302, that is, the audio data is divided into equal parts based on a framing threshold. For example, in a case of 24 frames per second, the audio data with the duration of two seconds may also be divided into 48 equal frames.

Operation S304b: Convert, by using an audio coefficient extraction algorithm, the audio data into a coefficient corresponding to the algorithm.

For each frame of the audio data, a coefficient $T_1$ for describing the voice of the user is separately generated by using a voice feature extraction algorithm. The server 200 converts the audio data by using a short-time Fourier transform coefficient, to generate a short-time Fourier transform coefficient $T_1$ of the voice. The short-time Fourier transform coefficient $T_1$ herein may be an array (h1, h2) with dimensions of (h1*h2), h1 may be a frame rate of the audio data, and h2 may be a short-time Fourier transform parameter.

In another embodiment of this application, the server 200 may further extract a coefficient from the audio data by using a linear predictive coding (LPC) feature extraction algorithm, a linear prediction cepstral coefficient (LPCC) feature extraction algorithm, or a linear prediction based mel-frequency cepstral coefficient (LBPMFCC) feature extraction algorithm, or the like.

Operation S304c: Input the coefficient corresponding to the audio data into a voice neural network model to calculate a voice feature corresponding to the audio data.

The voice neural network model herein may be a convolutional neural network (CNN), a deep neural network (DNN), a recurrent neural network (RNN), a long short-term memory (LSTM), or the like. When the voice neural network model is the convolutional neural network, the neural network may include a plurality of convolutional layers, pooling layers, and output layers, and input data of the neural network is audio data obtained after an STFT coefficient is extracted by using any one of the coefficient extraction algorithms in operation S304b. After the coefficient of the audio data of the voice of the user is input into the neural network, the corresponding voice feature is obtained. In this embodiment of this application, the output layer of the model may include N convolution kernels, and the STFT coefficient that is output from the model corresponds to one N-dimensional array. N herein is also configurable. For example, the user utters the voice of "enable navigation" with the duration of two seconds, and the word "enable" corresponds to audio data with duration of 0.5 second. After an STFT coefficient is extracted from the audio data, a voice feature that is of the audio data and that is output by using the model may be $T_A(A_1, \ldots, A_N)$. A herein may also be a floating point number.

In some embodiments, the voice neural network model may be a trained neural network model. A training process of the voice neural network model may be similar to the training process of the video neural network model in operation S303c, and includes: The server 200 may arrange, in chronological order, STFT coefficients corresponding to the voice uttered by the user, input the STFT coefficients into the voice neural network model, and train the voice neural network model. For example, the server 200 inputs, into the voice neural network model, the STFT coefficients corresponding to the voice of "enable navigation" that is uttered by the user and that is collected by the in-vehicle infotainment system 100, and compares a model output with the voice feature representing the voice of "enable navigation", to obtain an error, and updates a weight of the voice neural network model based on the error. It is considered that model training is completed until the final model output represents the voice feature of the voice of "enable navigation".

Figure 7A:
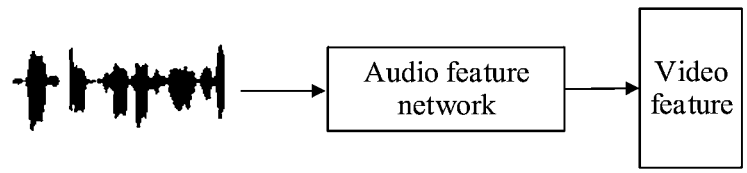
FIG. 7a shows a process of extracting a voice feature by an end-to-end voice feature deep neural network model according to some embodiments of this application.
Figure 7B:
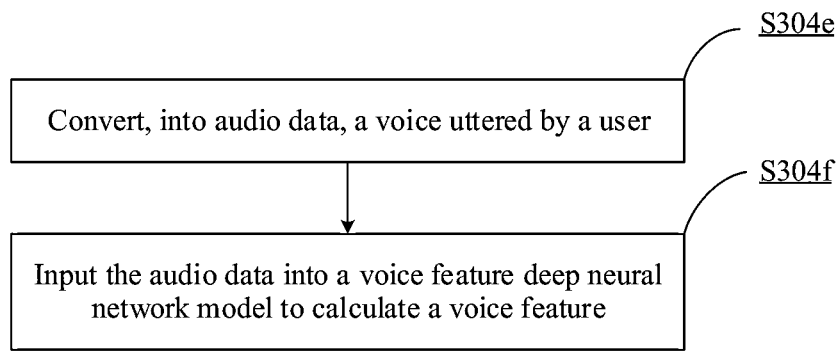
FIG. 7b is a flowchart of extracting the voice feature by the end-to-end voice feature deep neural network model described in FIG. 7a according to some embodiments of this application.

For the foregoing operation 304, in some other embodiments, FIG. 7a shows another method for extracting, by a server 200, a voice feature of a voice uttered by a user. A difference from the voice feature extraction method described in operation 304 is as follows: In this method, the voice feature is directly extracted, by using an end-to-end voice feature deep neural network model, from the voice uttered by the user. Specific operations of the method are shown in FIG. 7b, and include:

Operation S304e: Convert, into audio data, the voice uttered by the user.

The in-vehicle infotainment system 100 may convert, into the audio data by using the collection duration and the sampling rate in operation S304a, the collected voice uttered by the user, and then the in-vehicle infotainment system 100 sends the audio data to the server 200.

Operation S304f: Input the audio data into the voice feature deep neural network model to calculate the voice feature.

Herein, the voice feature deep neural network model may be a deep neural network (DNN), and the neural network may include a plurality of convolutional layers, pooling layers, and output layers. A difference from the voice neural network model in operation S304c is as follows: Input data of the voice feature deep neural network model is the audio data corresponding to the voice uttered by the user, and there is no need to extract a corresponding STFT coefficient from the audio data.

The server 200 inputs the audio data into a trained voice feature deep neural network model, and calculates, by using the model, a voice feature value $T_A$ corresponding to the audio data. The output layer of the model may include N convolution kernels, and each piece of audio data that is output from the model corresponds to one N-dimensional array. N herein is a configurable voice feature. A format and content of $T_A$ herein may be the same as those in operation S304c. A voice feature $T_A$ corresponding to each piece of audio data may be alternatively indicated by using one N-dimensional array.

In some embodiments, the voice feature deep neural network model may be a trained neural network model. A training process of the voice feature deep neural network model may be similar to the training process of the voice neural network model in operation S304c, and includes: The server 200 inputs, into the voice feature deep neural network model, audio data of the voice of "enable navigation" that is uttered by the user and that is collected by the in-vehicle infotainment system 100, compares a model output with the voice feature representing the voice of "enable navigation", to obtain an error, and updates a weight of the voice feature deep neural network model based on the error. It is considered that model training is completed until the final model output represents the voice feature of the voice of "enable navigation".

In another embodiment of this application, the server 200 may collect the voice and facial depth image data based on only one piece of collection duration without dividing the voice and the facial depth image data into frames by using a same framing threshold. For example, the server 200 may respectively input the facial depth image data with collection duration of two seconds and the corresponding voice into a video neural network and a voice neural network, to obtain a corresponding video feature and voice feature.

In addition, an output layer of the voice neural network and an output layer of the video neural network may include different quantities of convolutions. For example, the output layer of the voice neural network includes N convolution kernels and the output layer of the video neural network includes M convolution kernels. In this case, the voice feature output by the voice neural network is an N-dimensional array, and the video feature output by the video neural network is an M-dimensional array.

Figure 8:
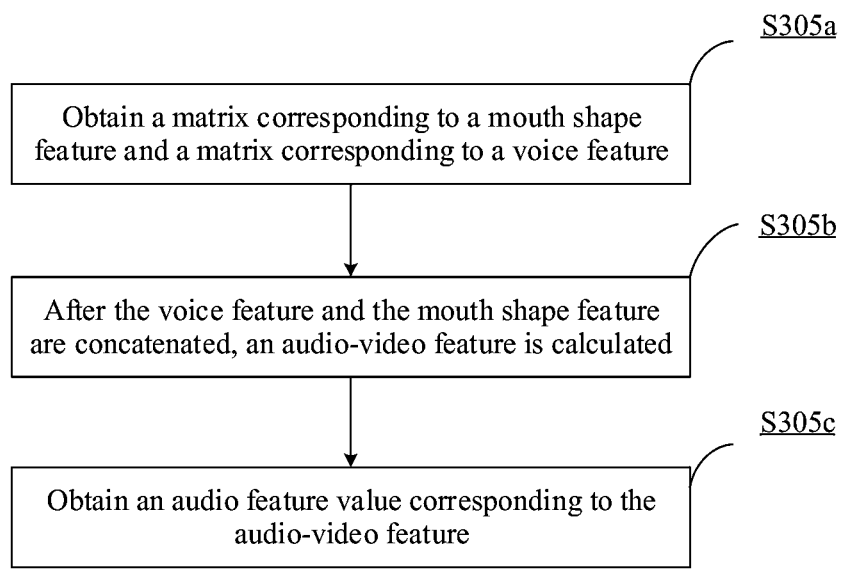
FIG. 8 is a flowchart of obtaining an audio-video feature by fusing a mouth shape feature and a voice feature according to some embodiments of this application.

For operation 305, in some embodiments, a manner in which the server 200 performs fusion calculation on the mouth shape feature and the voice feature, and inputs the mouth shape feature and the voice feature into an audio-video fusion model, to obtain the audio-video feature of the mouth shape feature and the voice feature is shown in FIG. 8. Specifically, the manner includes the following operations.

Operation S305a: Obtain a matrix corresponding to the mouth shape feature and a matrix corresponding to the voice feature.

For example, the mouth shape feature and the voice feature herein are collected based on same collection duration and obtained after collection and framing are performed based on a same framing threshold. When the output layer of the video neural network is the same as the output layer of the voice neural network, dimensions of the matrices including the features $T_A$ and $T_V$ corresponding to the mouth shape feature and the voice feature are also the same. For example, each of the features $T_A$ and $T_V$ generated by the voice neural network and the video neural network is N-dimensional, and the matrices including the features $T_A$ and $T_V$ are N-dimensional. Fusion calculation is performed on a matrix of a vector including $T_A$ and $T_V$, to obtain the audio-video feature.

The matrix of the voice feature:

$$\vec{A} = \begin{pmatrix} A_1 \\ A_2 \\ \vdots \\ A_N \end{pmatrix}$$

The matrix of the mouth shape feature:

$$\vec{V} = \begin{pmatrix} V_1 \\ V_2 \\ \vdots \\ V_N \end{pmatrix}$$

Operation S305b: After the voice feature and the mouth shape feature are concatenated, the audio-video feature is calculated.

An algorithm of calculating the audio-video feature is as follows: Column vectors are respectively extracted from the matrices corresponding to the audio feature and the mouth shape feature, and values of columns corresponding to the two matrices are concatenated and calculated. After the matrix of the voice feature is concatenated with the matrix of the mouth shape feature, the audio-video feature $\vec{M}$ $$\vec{M} = \begin{pmatrix} A_1 \\ \vdots \\ A_N \\ V_1 \\ \vdots \\ V_N \end{pmatrix}$$

is obtained.

In some embodiments, as described above, for the matrix of the voice feature and the matrix of the mouth shape feature that have different dimensions, fusion calculation may also be performed on such a voice feature and such a mouth shape feature through concatenation. For example, for an N-dimensional matrix of the voice feature:

$$\vec{A} = \begin{pmatrix} A_1 \\ A_2 \\ \vdots \\ A_N \end{pmatrix}$$

An M-dimensional matrix of the mouth shape feature:

$$\vec{V} = \begin{pmatrix} V_1 \\ V_2 \\ \vdots \\ V_M \end{pmatrix}$$

The audio-video feature $\vec{M}$ obtained after fusion may be shown as follows:

$$\vec{M} = \begin{pmatrix} A_1 \\ \vdots \\ A_N \\ V_1 \\ \vdots \\ V_M \end{pmatrix}.$$

In another embodiment of this application, weighting calculation may be performed on the matrix of the voice feature and the matrix of the mouth shape feature, to obtain the audio-video feature. For example, $\vec{M} = \alpha * \vec{A} + (1-\alpha) \vec{V}$ may be obtained by using the following formula. Herein $\alpha$ is a weight value.

Operation S305c: Obtain a voice feature value corresponding to the audio-video feature.

The audio-video feature is input into a voice feature neural network model. An output layer of the model includes at least one fully connected layer, each fully connected layer may include M nodes, and the audio-video feature output from the model corresponds to one M-dimensional array. M herein is configurable. Afterwards, the voice feature neural network model inputs the M-dimensional array corresponding to the audio-video feature into a softmax layer, and the softmax layer is used to normalize the audio-video feature, that is, calculate information indicated by a voice saved, in the voice feature neural network model, by each element in the M-dimensional array corresponding to the obtained audio-video feature, that is, a proportion in a sum of values corresponding to a text, and a probability of an audio-video feature is obtained. A proportion of each element in the M-dimensional array is between (0, 1), that is, a probability of the text corresponding to the audio-video feature is obtained after the audio-video feature passes through the softmax layer, that is, the voice feature value. For example, when a sum of values corresponding to a saved text in a voice feature neural network model of an audio-video feature (2, 4, 12, 15) is 100, voice feature values obtained after the audio-video feature passes through the softmax layer are (0.02, 0.04, 0.12, 0.15).

In some other embodiments of this application, the server 200 may further separate, from a high-frequency harmonic part (representing a sound uttering object uttering the voice, that is, a feature of a sound source of the user) through linear prediction, a low-frequency part (representing a sound uttering object uttering the voice, that is, a feature of a sound channel of the user) in the voice uttered by the user, and respectively extract a feature of the separated low-frequency part and a feature of the separated high-frequency harmonic part by using a corresponding feature extraction algorithm, to obtain a low audio feature corresponding to the low-frequency part (referred to as a sound channel signal for short) of an audio and a high audio feature corresponding to the high-frequency harmonic part (referred to as a sound source signal for short). Finally, the low audio feature of the sound channel signal and the high audio feature of the sound source signal are fused to obtain the voice feature of the user.

For example, an example in which the server 200 extracts a feature parameter of the voice uttered by the user is used.

In some embodiments, the server 200 separates, by using a linear predictor, the sound channel signal in the voice uttered by the user. A difference between the voice uttered by the user and the sound channel signal is obtained, so that the sound source signal in the voice uttered by the user can be obtained.

Afterwards, the server 200 performs feature extraction on the sound channel signal and the sound source signal that are separated from the voice uttered by the user. For example, in the feature extraction manner described in operation S304*b*, short-time Fourier transform extraction is performed on the sound channel signal separated from the voice uttered by the user, to obtain a short-time Fourier transform coefficient corresponding to the sound channel signal. The server 200 extracts, through multi-scale wavelet transform, a time-frequency feature vector of the sound source signal separated from the voice uttered by the user.

It can be understood that the sound channel feature of the foregoing sound channel signal may be extracted by using another audio feature extraction algorithm used for simulating a perception capability of a cochlea of a human ear, for example, a linear prediction cepstral coefficient (LPCC) extraction algorithm. In addition to wavelet transform, the time-frequency feature vector in the sound source signal may be alternatively extracted by using another algorithm, for example, a pitch detection algorithm. This is not limited herein.

Finally, the server 200 fuses the short-time Fourier transform coefficient extracted from the sound channel signal and the time-frequency feature vector extracted from the sound source signal, to obtain the voice feature of the voice. For example, in some embodiments, the short-time Fourier transform coefficient and the time-frequency feature vector may be linearly fused and combined into a feature vector, or may be normalized and then linearly fused, or may be weighted and then linearly fused. In another embodiment, the short-time Fourier transform coefficient and the time-frequency feature vector may be further nonlinearly fused, for example, the short-time Fourier transform coefficient and the time-frequency feature vector are multiplied. In a specific implementation process, a fusion rule may be preset as required. This is not limited in this solution.

In addition, in some other embodiments, after separating the sound channel signal and the sound source signal from the voice uttered by the user, the server 200 may perform short-time Fourier transform extraction only on the sound channel signal, to obtain the short-time Fourier transform coefficient corresponding to the sound channel signal. The short-time Fourier transform coefficient is used as the voice feature of the voice. The time-frequency feature vector of only the sound source signal may be alternatively extracted through multi-scale wavelet transform, and the time-frequency feature vector of the sound source signal is used as the voice feature of the voice.

After the voice feature value is obtained from the audio-video feature obtained through fusion, operation S306: The server 200 recognizes, from the voice feature value, the voice uttered by the user.

After the voice feature value is obtained by using the voice feature neural network model, the voice corresponding to the voice feature value may be recognized by using a speech recognition neural network model. Deduplication calculation is performed on the voice feature value in the neural network model by using a temporal classification algorithm (Connectionist Temporal Classification, CTC), that is, a probability of a text. Voices corresponding to voice feature values are all arranged in chronological order, and adjacent and duplicated texts in the voice feature values may be removed by using the time series classification algorithm. Finally, a text corresponding to the voice uttered by the user is recognized from the voice feature value calculated by using the time series classification algorithm. In some embodiments, after recognizing the text corresponding to the voice uttered by the user, the server 200 returns the text to the in-vehicle infotainment system 100, and the in-vehicle infotainment system 100 may execute an instruction corresponding to the voice. For example, after the server 200 recognizes that the text corresponding to the voice uttered by the user is "enable navigation", the in-vehicle infotainment system 100 starts a navigation APP installed in the in-vehicle infotainment system 100, and displays an interface of the navigation APP on a screen of the in-vehicle infotainment system 100.

In another embodiment of the present invention, after the in-vehicle infotainment system 100 collects the voice of the user and the facial depth image by using the microphone 110C and the depth camera 120, the in-vehicle infotainment system 100 may execute, by using a processor 130 of the in-vehicle infotainment system 100, a deep neural network stored in the internal memory 140. After recognizing the voice of "enable navigation" from the voice and the facial depth image, the in-vehicle infotainment system 100 starts the installed navigation APP.

In addition to the in-vehicle infotainment system 100, in the vehicle, the voice uttered by the user may be directly collected by using a microphone of a mobile phone and a facial depth image obtained when the user utters the voice may be shot by using a depth camera of the mobile phone. Next, the mobile phone respectively extracts a voice feature and a mouth shape feature of the user from the voice and the facial depth image, fuses the voice feature and the mouth shape feature of the user into an audio-video feature, and recognizes the voice of the user based on the audio-video feature. For example, the user utters a voice of "enable navigation" to the mobile phone during driving. After recognizing the text of "enable navigation" by fusing the voice of "enable navigation" and a facial depth image obtained when the user utters the voice, the mobile phone starts a navigation APP.

It can be understood that, in addition to being applied to the foregoing in-vehicle infotainment system 100, the speech recognition method in the present invention may be further applied to some other scenarios, for speech recognition, in which light of an environment greatly changes, for example, a shopping guide robot in a shopping mall, or for another example, a guide robot in a hospital. A speech recognition process of a shopping guide robot in a shopping mall in the present invention is described below by using a voice of a user and a facial depth image obtained when the user utters the voice as an example.

a: The user entering the shopping mall may send a speech recognition trigger instruction to the shopping guide robot by using a button disposed on the shopping guide robot with a speech recognition trigger function, so that the shopping guide robot enters a speech recognition mode. The button may be a hard button disposed on the shopping guide robot, or may be a button disposed, with a speech recognition trigger function, on a human-computer interaction interface of a display of the shopping guide robot.

For example, after pressing the speech recognition button of the shopping guide robot, the user utters "enable the speech recognition function" to the shopping guide robot, to enable the shopping guide robot to enter the speech recognition mode.

b: The shopping guide robot respectively collects, by using a microphone and a depth camera, the voice uttered by the user and the facial depth image obtained when the user utters the voice.

For example, if the user utters a voice of "which floor are the sports goods on" to the shopping guide robot, the shopping guide robot may collect, by using the microphone, and save the voice uttered by the user. In addition, the shopping guide robot collects, by using the depth camera with a depth perception technology, the facial depth image obtained when the user utters the voice.

c: The shopping guide robot extracts a mouth shape feature and a voice feature of the user from the voice and the facial depth image.

For example, the shopping guide robot extracts, by using a feature neural network model stored in a memory of the shopping guide robot, a mouth shape feature and a voice feature from the voice of "which floor are the sports goods on" uttered by the user and the facial depth image obtained when the user utters the voice. The neural network model may be obtained through pre-training. In another embodiment, the shopping guide robot may further send the voice and the facial depth image to a server that communicates with the shopping guide robot, and the server extracts a mouth shape feature and a voice feature from the voice of "which floor are the sports goods on" uttered by the user and the facial depth image obtained when the user utters the voice.

d: After performing fusion calculation on the mouth shape feature and the voice feature that are extracted, the shopping guide robot obtains an audio-video feature obtained after the mouth shape feature and the voice feature are fused, and recognizes, based on the audio-video feature, the voice uttered by the user.

For example, the mouth shape feature and the voice feature may be calculated by using a fusion algorithm of concatenation or weighting, to obtain the audio-video feature. Then, the voice of the user corresponding to the audio-video feature is recognized by using the voice neural network model stored in the memory of the shopping guide robot. After recognizing a text corresponding to the voice uttered by the user, the shopping guide robot may execute an instruction corresponding to the voice. After the shopping guide robot recognizes that the text corresponding to the voice uttered by the user is "which floor are the sports goods on", the shopping guide robot feeds back a response voice of "$5^{th}$ floor" to the user by using a speaker.

Figure 9:
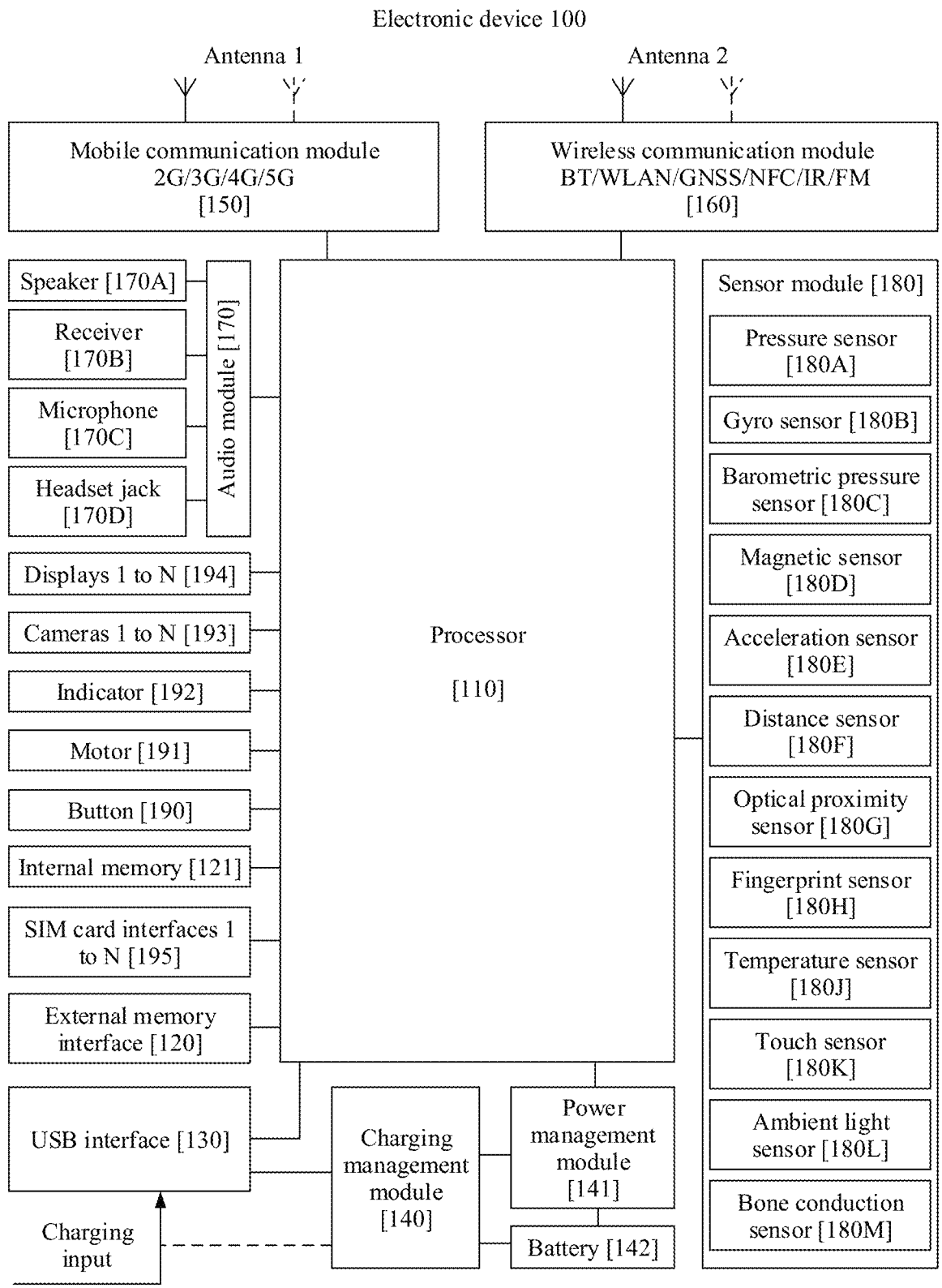
FIG. 9 is a schematic diagram of a structure of an electronic device according to some embodiments of this application.

FIG. 9 is a schematic diagram of a structure of another electronic device 100 that may implement a function of the in-vehicle infotainment system 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules that is shown in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide wireless communication solutions that include 2G, 3G, 4G, 5G, or the like and that are applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 of the electronic device 100 are coupled, and the antenna 2 and the wireless communication module 160 of the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 may implement a display function through the GPU, the display 194, the application processor, and the like. The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like. In some embodiments, the camera 193 may be the depth camera 120 in embodiments of this application, or structured light, or a laser emitter (Time of Flight, TOF), and is configured to collect a facial depth image obtained when a user utters a voice.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory, or a universal flash storage (UFS). The processor 110 runs instructions stored in the internal memory 121 and/or instructions stored in the memory disposed in the processor, to perform various function applications and data processing of the electronic device 100. In some embodiments, the internal memory 121 may be configured to store neural network models of audio and video features and a speech recognition neural network model in embodiments of this application.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or voice information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may put the mouth of the user close to the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may be alternatively disposed in the electronic device 100, to collect a sound signal, implement noise reduction, and identify a sound source, to implement a directional recording function and the like. In some embodiments, the microphone 170C may be the microphone 110C in embodiments of this application, and is configured to collect the voice uttered by the user.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

In some embodiments, the sensor module 180 may be the sensor 103 in embodiments of this application, and is configured to determine, by sensing an event, a scenario in which the electronic device 100 is located.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180K is also referred to as a "touch component". The touch sensor 180K may be disposed on the display 194, and the touch sensor 180K and the display 194 form a touchscreen that is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may be alternatively disposed on a surface of the electronic device 100 at a location different from a location of the display 194.

The button 190 includes a power button, a volume button, and the like. The button 190 may be a mechanical button or a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

It should be understood that although the terms "first", "second", and the like may be used in this specification to describe various features, the features should not be limited by the terms. The terms are used for distinction only and should not be construed as indicating or implying relative importance. For example, a first feature may be referred to as a second feature, and similarly, a second feature may be referred to as a first feature, without departing from the scope of examples of embodiments.

In addition, various operations are described as a plurality of discrete operations in a manner that is most helpful in understanding the illustrative embodiments. However, the described order should not be construed as implying that the operations should depend on the described order, and many of the operations may be performed in parallel, concurrently, or simultaneously. In addition, the order of the operations may be alternatively rearranged. The processing may be terminated when the described operations are completed. However, there may be additional operations not included in the accompanying drawings. The processing may correspond to a method, a function, a procedure, a subroutine, a subprogram, or the like.

References in this specification to "one embodiment" "an embodiment", "illustrative embodiment" and the like indicate that the described embodiment may include a particular feature, structure, or property, but that each embodiment may or may not include the particular feature, structure, or property. In addition, the phrases do not necessarily refer to a same embodiment. In addition, when particular features are described with reference to specific embodiments, the knowledge of a person skilled in the art can affect a combination of the features with other embodiments, regardless of whether the embodiments are explicitly described.

The terms "comprising", "having", and "including" are synonyms unless otherwise specified in the context. The phrase "A/B" indicates "A or B". The phrase "A and/or B" indicates "(A), (B), or (A and B)".

As used in this specification, the term "module" may refer to, be a part of, or include: a memory (shared, dedicated, or grouped) for running one or more software or firmware programs, an application-specific integrated circuit (ASIC), an electronic circuit and/or a processor (shared, dedicated, or grouped), a combinational logic circuit, and/or another suitable component that provides the described function.

In the accompanying drawings, some structural or methodological features may be shown in a particular arrangement and/or order. However, it should be understood that such a particular arrangement and/or order is not mandatory. However, in some embodiments, the features may be described in a manner and/or order different from that shown in the illustrative accompanying drawings. In addition, inclusion of structural or methodological features in a particular accompanying drawing does not mean that all embodiments need to include such features. In some embodiments, the features may not be included, or the features may be combined with other features.

Embodiments of this application are described in detail above with reference to the accompanying drawings. However, use of the technical solutions of this application is not limited to the various applications mentioned in embodiments of this patent, and various structures and variations can be easily implemented by referring to the technical solutions of this application, to achieve the various beneficial effects mentioned in this specification. Within the knowledge of a person of ordinary skill in the art, various changes made without departing from the purpose of this application shall all fall within the coverage scope of the patent of this application.

What is claimed is:

1. A speech recognition method for an electronic device, comprising:
    obtaining a facial depth image of a user and a to-be-recognized voice of the user, wherein the facial depth image of the user is an image collected by using a depth camera;
    recognizing a mouth shape feature from the facial depth image of the user, and recognizing a voice feature from the to-be-recognized voice of the user; and
    fusing the voice feature and the mouth shape feature into an audio-video feature, and recognizing, based on the audio-video feature, a voice uttered by the user;
    wherein recognizing the mouth shape feature from the facial depth image of the user comprises:
    performing noise reduction on the facial depth image of the user, and binarizing the facial depth image of the user based on depth information of each pixel in a facial depth image obtained after noise reduction, to obtain a binarized image; and
    determining contours of lips in the binarized image, and segmenting the lips based on the contours of the lips.

2. The method according to claim 1, wherein obtaining the facial depth image of the user and the to-be-recognized voice of the user comprises:
    emitting an infrared light pulse through a face of the user and obtaining an infrared light pulse reflected by the face of the user;
    calculating a time difference based on a change between phases of the emitted and reflected infrared light pulses;
    calculating depth information of the face of the user with reference to a propagation speed of the infrared light pulse reflected by the face of the user and the time difference; and
    saving the depth information as the facial depth image of the user.

3. The method according to claim 2, wherein the depth information is a value formed by performing uniform quantizing on a maximum depth distance and a minimum depth distance between the face of the user and the electronic device.

4. The method according to claim 1, wherein a mouth shape feature corresponding to the lips is obtained by using a convolutional neural network.

5. The method according to claim 1, wherein recognizing the mouth shape feature from the facial depth image of the user comprises:
    separating a lip region sub-image from the facial depth image of the user; and
    inputting the lip region sub-image into a convolutional neural network to obtain a mouth shape feature corresponding to the lip region sub-image.

6. The method according to claim 1, wherein recognizing the voice feature from the to-be-recognized voice of the user comprises:
    separating a first frequency band range part and a second frequency band range part from the to-be-recognized voice of the user by using a linear predictor, wherein a frequency of a frequency band comprised in the first frequency band range part is lower than a frequency of a frequency band comprised in the second frequency band range part; and
    fusing at least one of a first voice feature extracted from the first frequency band range part and a second voice feature extracted from the second frequency band range part as the voice feature from the to-be-recognized voice of the user.

7. The method according to claim 6, wherein the first voice feature and the second voice feature are fused to obtain the voice feature from the to-be-recognized voice of the user.

8. The method according to claim 6, wherein
    the first voice feature is extracted from the first frequency band range part by using a voice feature extraction algorithm used for simulating a perception capability of a cochlea of a human ear; and
    the voice feature extraction algorithm used for simulating a perception capability of a cochlea of a human ear is a mel-frequency cepstral coefficient (MFCC) extraction method, and the first voice feature is a MFCC.

9. The method according to claim 6, wherein
    the second voice feature is extracted from the second frequency band range part through wavelet transform, wherein the second voice feature is a time-frequency feature obtained through wavelet transform.

10. The method according to claim 9, wherein separating the first frequency band range part and the second frequency band range part from the to-be-recognized voice of the user by using the linear predictor comprises:

separating the first frequency band range part from the to-be-recognized voice of the user by using the linear predictor, and using, as the second frequency band range part, a remaining part of the to-be-recognized voice of the user obtained after the first frequency band range part is separated.

11. The method according to claim 6, wherein the first frequency band range part represents a feature of a sound channel of a sound-uttering object that utters audio, and the second frequency band range part represents a feature of a sound source of the sound-uttering object.

12. The method according to claim 1, wherein fusing the voice feature and the mouth shape feature into the audio-video feature comprises:

obtaining a voice feature matrix and a mouth shape feature matrix respectively corresponding to the voice feature and the mouth shape feature, wherein a dimension of the voice feature matrix is the same as a dimension of the mouth shape feature matrix; and calculating an audio-video feature corresponding to the voice feature matrix and the mouth shape feature matrix through concatenation.

13. The method according to claim 12, wherein weighting calculation is performed on a value of the voice feature matrix and a value of the mouth shape feature matrix to obtain the audio-video feature corresponding to the voice feature matrix and the mouth shape feature matrix.

14. The method according to claim 1, wherein recognizing the voice uttered by the user comprises:

obtaining, through a convolutional neural network, a voice feature value corresponding to the audio-video feature, wherein the voice feature value is used to represent a probability of information indicated by the voice uttered by the user; and recognizing, based on the probability of the information, the voice uttered by the user.

15. The method according to claim 14, wherein deduplication calculation is performed on the voice feature value by using a time series classification algorithm, to remove repeated information comprised in the voice feature value.

16. An electronic device, comprising:

a depth camera configured to obtain a facial depth image of a user;

a processor; and a memory coupled to the processor and storing instructions, which when executed by the processor, cause the electronic device to control the depth camera and perform operations, the operations comprising:

obtaining the facial depth image of the user and a to-be-recognized voice of the user, wherein the facial depth image of the user is an image collected by using a depth camera;

recognizing a mouth shape feature from the facial depth image of the user, and recognizing a voice feature from the to-be-recognized voice of the user; and fusing the voice feature and the mouth shape feature into an audio-video feature, and recognizing, based on the audio-video feature, a voice uttered by the user;

wherein recognizing the mouth shape feature from the facial depth image of the user comprises:

performing noise reduction on the facial depth image of the user, and binarizing the facial depth image of the user based on depth information of each pixel in a facial depth image obtained after noise reduction, to obtain a binarized image; and determining contours of lips in the binarized image, and segmenting the lips based on the contours of the lips.

17. The electronic device according to claim 16, wherein obtaining the facial depth image of the user and the to-be-recognized voice of the user comprises:

emitting an infrared light pulse through a face of the user and obtaining an infrared light pulse reflected by the face of the user;

calculating a time difference based on a change between phases of the emitted and reflected infrared light pulses;

calculating depth information of the face of the user with reference to a propagation speed of the infrared light pulse reflected by the face of the user and the time difference; and saving the depth information as the facial depth image of the user.

18. A non-transitory computer-readable medium storing instructions, which when run on a computer, cause the computer to perform operations, the operations comprising:

obtaining a facial depth image of a user and a to-be-recognized voice of the user, wherein the facial depth image of the user is an image collected by using a depth camera;

recognizing a mouth shape feature from the facial depth image of the user, and recognizing a voice feature from the to-be-recognized voice of the user; and fusing the voice feature and the mouth shape feature into an audio-video feature, and recognizing, based on the audio-video feature, a voice uttered by the user;

wherein recognizing the mouth shape feature from the facial depth image of the user comprises:

performing noise reduction on the facial depth image of the user, and binarizing the facial depth image of the user based on depth information of each pixel in a facial depth image obtained after noise reduction, to obtain a binarized image; and determining contours of lips in the binarized image, and segmenting the lips based on the contours of the lips.

* * * * *